(12) United States Patent
Suzuki et al.

(10) Patent No.: US 7,713,598 B2
(45) Date of Patent: May 11, 2010

(54) INK JET RECORDING MEDIUM WITH LENTICULAR LENSES

(75) Inventors: Katsuhito Suzuki, Nagano-Ken (JP); Tomio Sonehara, Nagano-Ken (JP); Jun Sugiyama, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 985 days.

(21) Appl. No.: 11/475,560

(22) Filed: Jun. 27, 2006

(65) Prior Publication Data
US 2007/0148375 A1    Jun. 28, 2007

(30) Foreign Application Priority Data
Jun. 27, 2005 (JP) ............................. 2005-186477
Jul. 28, 2005 (JP) ............................. 2005-219267
Jul. 28, 2005 (JP) ............................. 2005-219455

(51) Int. Cl.
*B41M 5/00* (2006.01)

(52) U.S. Cl. .................... 428/32.12; 428/203; 428/343; 428/352; 428/913.3; 428/914

(58) Field of Classification Search ............... 428/32.12, 428/203, 343, 352, 913.3, 914
See application file for complete search history.

(56) References Cited

U.S. PATENT DOCUMENTS

2002/0196296 A1* 12/2002 Gu ................................. 347/1
2004/0121257 A1* 6/2004 Kaminsky et al. ............. 430/201
2005/0122489 A1* 6/2005 Suzuki ........................ 355/22

* cited by examiner

*Primary Examiner*—Betelhem Shewareged
(74) *Attorney, Agent, or Firm*—Ladas and Parry LLP

(57) ABSTRACT

Disclosed is a recording medium with a lenticular lens for ink jet recording. The recording medium includes: a lenticular lens layer having a convex part surface, on which a plurality of semicylindrical or arcuate and elongated convexes are arranged in parallel, and a backside surface; and an ink absorptive layer provided on the backside surface of the lenticular lens layer. In the recording medium, an ink permeable layer for avoiding the stay of ink droplets on a recorded face after printing, or an adhesive layer for rendering the recording medium easily fixable to a wall, a mount and the like, or a temporarily applicable part is further provided.

14 Claims, 5 Drawing Sheets

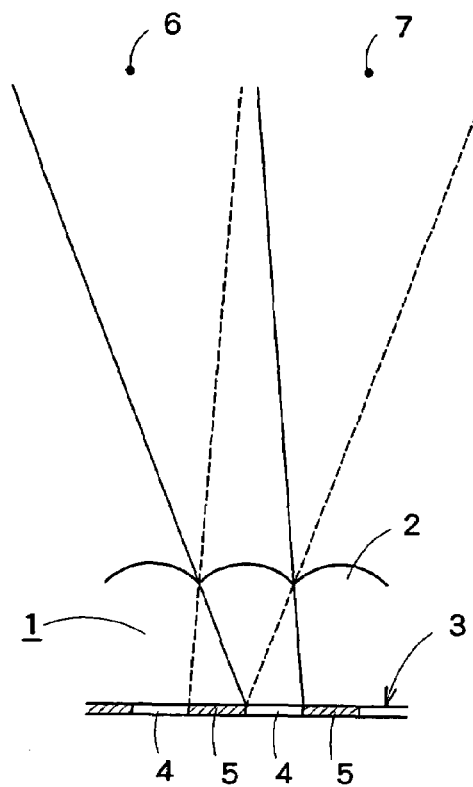
F I G. 1
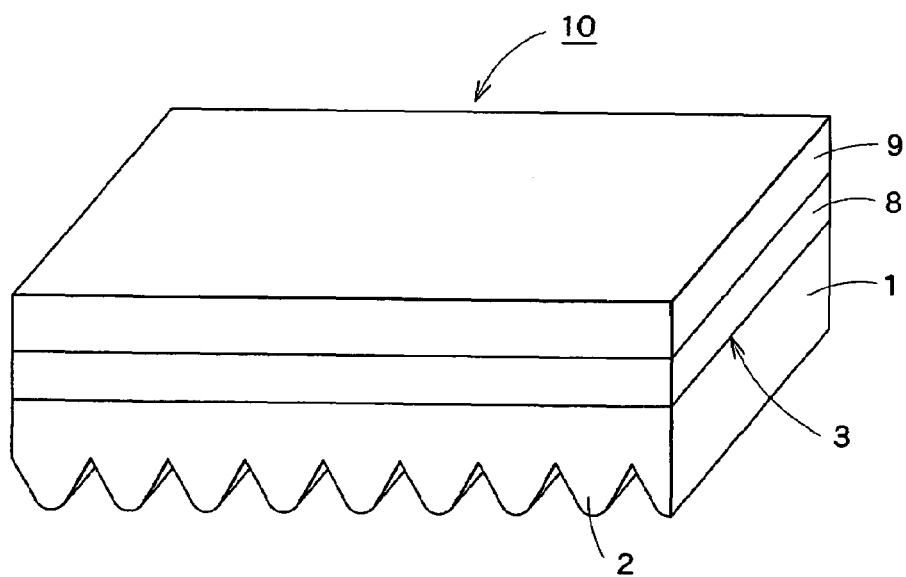
F I G. 2

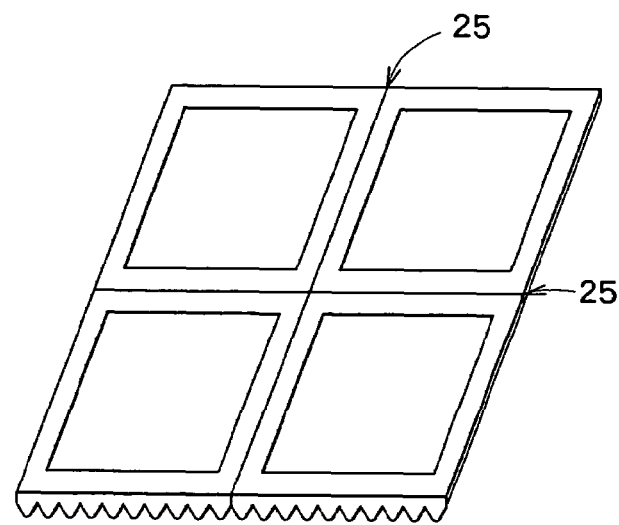
F I G. 5
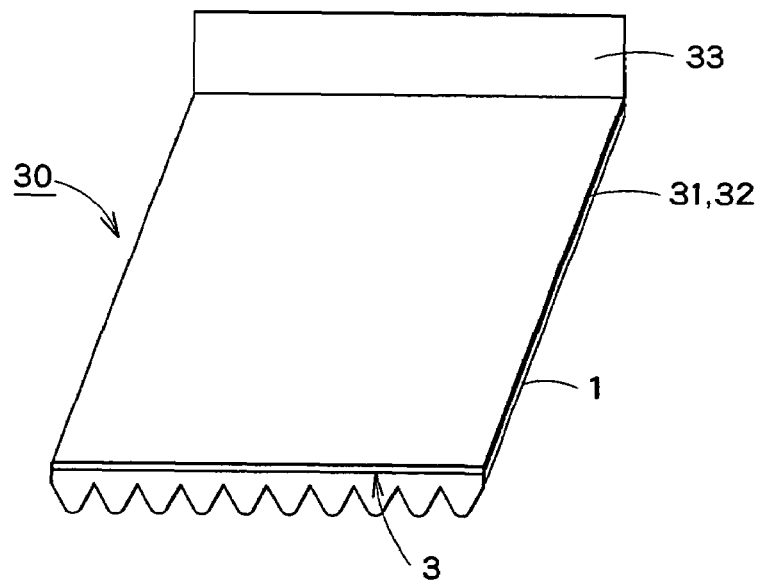
F I G. 6

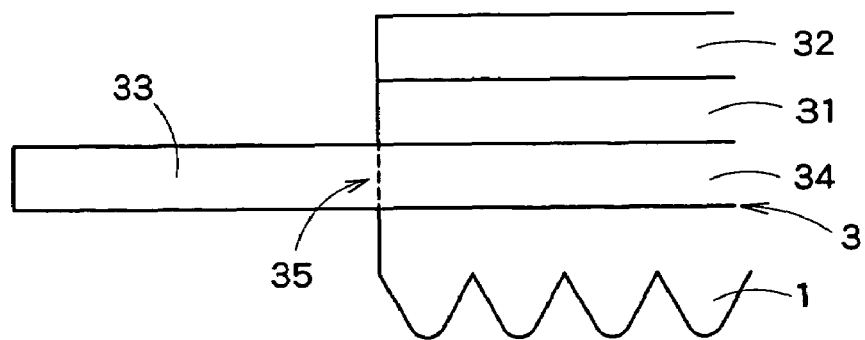
F I G. 7
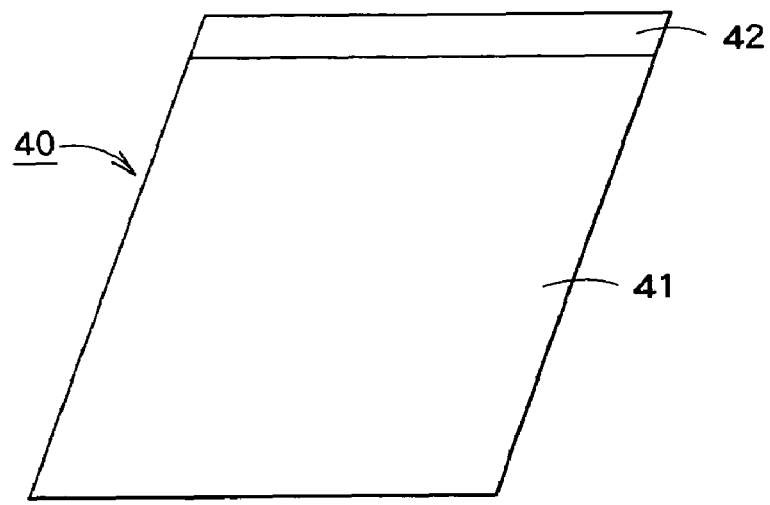
F I G. 8

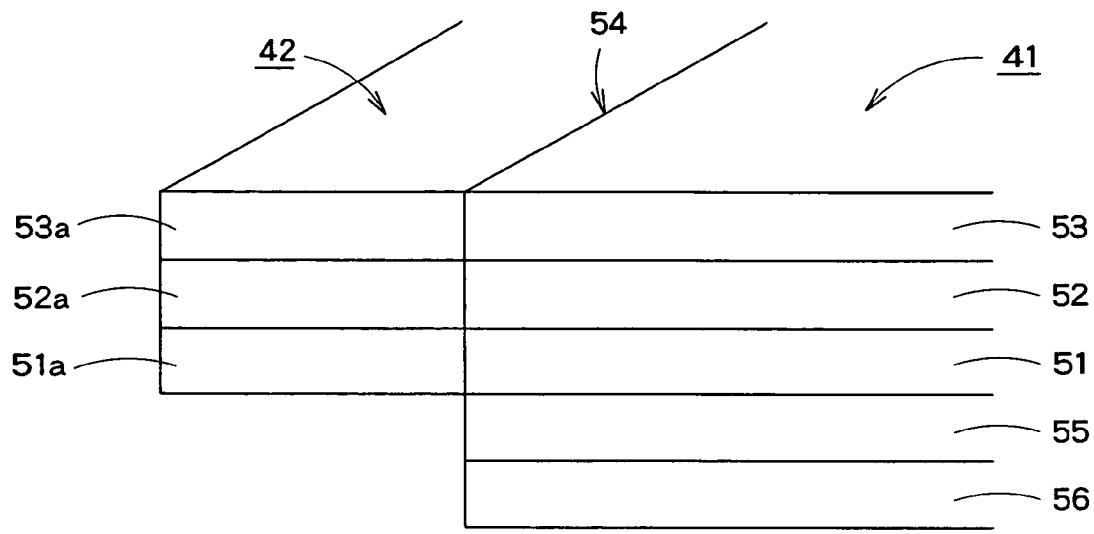
F I G. 9
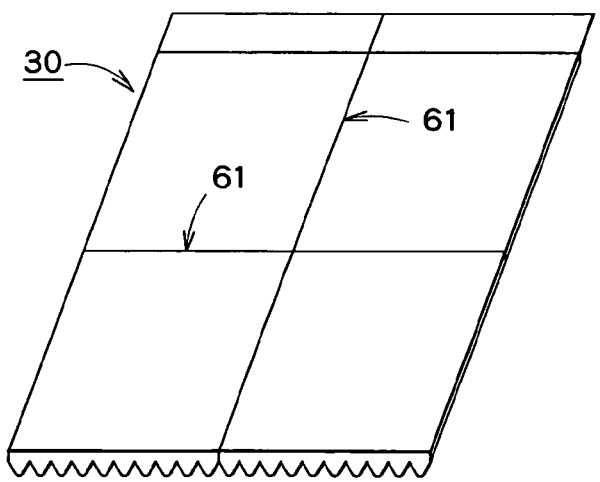
F I G. 10

INK JET RECORDING MEDIUM WITH LENTICULAR LENSES

CROSS REFERENCE TO RELATED APPLICATIONS

This application claims the benefit of priorities of Japanese Patent Application No. 186477/2005 filed on Jun. 27, 2005, Japanese Patent Application No. 219267/2005 filed on Jul. 28, 2005, and Japanese Patent Application No. 219455/2005 filed on Jul. 28, 2005, which are incorporated herein by reference.

BACKGROUND OF THE INVENTION

1. Field of the Invention

The present invention relates to a recording medium that can realize the formation of a three-dimensional image or a motion picture using lenticular lenses by an ink jet recording method.

2. Background Art

There is a method for the so-called 3D printing for rendering printed images observable three-dimensionally or as if the images are in motion, using a lenticular lens. The lenticular lens is an array of lenses comprising a plurality of arranged semicylindrical or arcuate and elongated convexes. When an image is observed through the lenticular lens, the left and right eyes of a viewer perceive respective different images so that the images are perceived three-dimensionally or as if the images are in motion.

A proposal has already been made on the formation of images using the above lenticular lens by an ink jet recording method (Japanese Patent Laid-Open No. 137034/1996).

SUMMARY OF THE INVENTION

An object of the first aspect of the present invention is to provide a recording medium suitable for image formation using a lenticular lens, especially a recording medium that is free from the stay of ink droplets on a recorded face after printing and can be touched immediately after printing.

According to a first aspect of the present invention, there is provided a recording medium comprising: a lenticular lens layer having a convex part surface, on which a plurality of semicylindrical or arcuate and elongated convexes are arranged in parallel, and a backside surface; and an ink absorptive layer provided on the backside surface of the lenticular lens layer, printing being performed from the ink absorptive layer side by an ink jet recording method to record an image, and further comprising an ink permeable layer which is provided as an outermost surface-side layer in the recording medium on its printing side.

An object of the second aspect of the present invention is to provide a recording medium for ink jet recording, which is suitable for image formation using a lenticular lens and can easily be fixed onto a support such as a wall or a mount.

According to a second aspect of the present invention, there is provided a recording medium comprising: a lenticular lens layer having a convex part surface, on which a plurality of semicylindrical or arcuate and elongated convexes are arranged in parallel, and a backside surface; and an ink absorptive layer provided on the backside surface of the lenticular lens layer, printing being performed from the ink absorptive layer side by an ink jet recording method to record an image, and further comprising an adhesive layer, provided on a part of the recording medium on its printing side, through which the recording medium can be fixed onto a support.

An object of the third aspect of the present invention is to provide a recording medium for ink jet recording, which is suitable for image formation using a lenticular lens and can easily be fixed onto a support such as a postcard, a wall, or a mount.

According to a third aspect of the present invention, there is provided a recording medium comprising: a lenticular lens layer having a convex part surface, on which a plurality of semicylindrical or arcuate and elongated convex parts are arranged in parallel, and a backside surface; and an ink absorptive layer provided on the backside surface of the lenticular lens layer, printing being performed from the ink absorptive layer side by an ink jet recording method to record an image, and further comprising a part that, in use, is applied to one side of a sheet having an adhesive layer on its one or both sides and is temporarily applicable to the sheet.

BRIEF DESCRIPTION OF THE DRAWINGS

FIG. 1 is a typical diagram showing a principle of the formation of a three-dimensional image or a motion picture by a lenticular lens;

FIG. 2 is a diagram showing a fundamental structure of the recording medium according to the first aspect of the present invention;

FIG. 5 is a diagram showing a plurality of recording media connected to each other through easy separation means 15;

FIG. 6 is a diagram showing a fundamental structure of the recording medium according to the third aspect of the present invention;

FIG. 7 is an enlarged view of a part 33 and its vicinity shown in FIG. 6;

FIG. 8 is a diagram showing a fundamental structure of a sheet having an adhesive layer on its one or both sides to be applied to the recording medium according to the third aspect of the present invention;

FIG. 9 is an enlarged view of a part 42 or its vicinity shown in FIG. 8; and

FIG. 10 is a diagram showing a plurality of recording media connected to each other through easy separation means 61.

DETAILED DESCRIPTION OF THE INVENTION

Lenticular Lens

Figure 3:
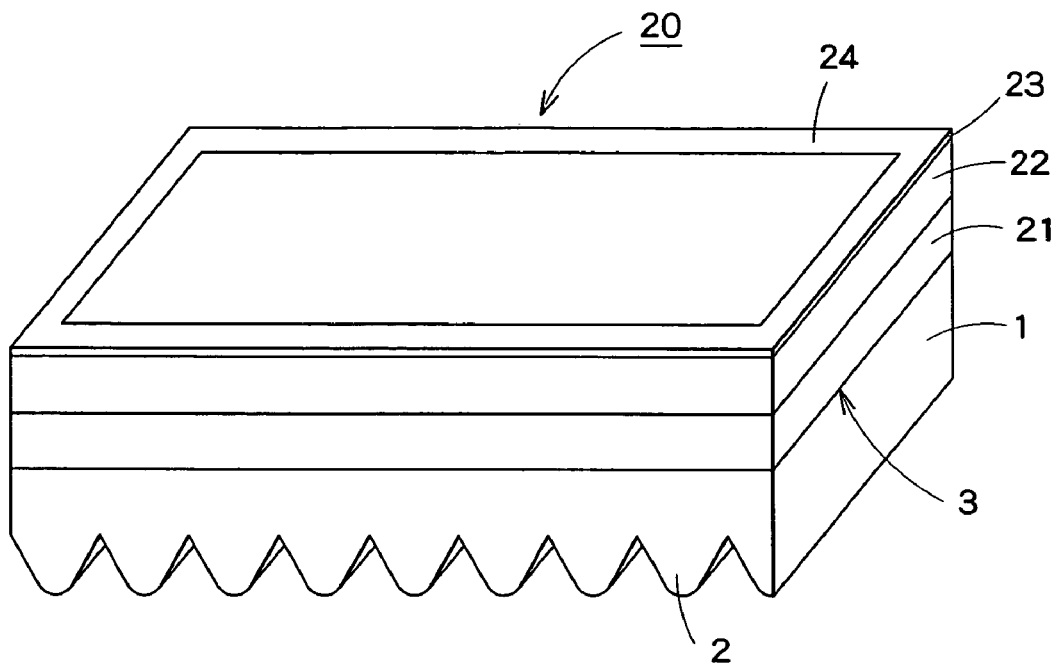
FIG. 3 is a diagram showing a fundamental structure of the recording medium according to the second aspect of the present invention.

The lenticular lens used in the present invention refers to an array of lenses (a lens array) comprising a plurality of arranged semicylindrical or arcuate and elongated convexes. The lenticular lens has a convex part surface, on which a plurality of semicylindrical or arcuate and elongated convexes are arranged in parallel, and a backside surface which is a surface of the lenticular lens remote from the convexes. The backside surface is substantially flat. FIG. 1 is a typical diagram showing a principle of the formation of a three-dimensional image or a motion picture by a lenticular lens. Specifically, a lenticular lens 1 has a surface, on which an array of a plurality of semicylindrical or arcuate and elongated convexes 2 arranged in parallel, and a backside surface 3 remote from the convexes 2. The backside surface 3 is substantially flat. An image 4 for the right eye and an image 5 for the left eye are provided preferably in contact with each other on the backside surface 3. When these images are viewed from the convex side, the image 4 for the right eye is perceived by the right eye 6 while the image 5 for the left eye is perceived by the left eye 7. When the image 4 for the right eye and the image 5 for the left eye are constructed so as to form parallactic images by the parallax between the two eye views by a viewer, the viewer perceives the images as a three-dimensional image. On the other hand, when two or more types of images, which are perceived differently depending upon the angle of line of sight, are provided for the image for the right eye and the image for the left eye, angle-dependent different images are perceived. In this case, when these images are brought to continuous images, they are perceived as a motion picture.

The recording medium according to the present invention comprises a layer of this lenticular lens. The lenticular lens layer may be formed of any material without particular limitation so far as the function of the lenticular lens is provided. Preferred materials include resins, for example, PET, PETG, APET, PP, PS, PVC, acrylic resins, and UV curing resins.

Recording Medium According to First Aspect of Invention

A recording medium 10 according to the first aspect of the present invention has a fundamental structure as shown in FIG. 2. In FIG. 2, an ink absorptive layer 8 is provided on a lenticular lens layer 1 in its backside surface 3, and an ink permeable layer 9 is provided on the outermost surface of the recording medium 10 remote from the lenticular lens layer 1.

In the recording medium according to the first aspect of the present invention, recording is carried out by an ink jet recording method from the ink permeable layer 9 side which is opposite to the lenticular lens layer 1. Ink droplets ejected by the ink jet recording method are deposited onto the ink permeable layer 9, are permeated through the ink permeable layer 9, reach the ink absorptive layer 8, and are fixed within the ink absorptive layer 8, preferably the ink absorptive layer 8 in its part very close to the backside surface 3 of the lenticular lens 1 to form an image. The image is formed by an ink jet recording method so as to be perceived as a three-dimensional image or a motion picture through the lenticular lens. The ink permeable layer 9 has the function of leading ink droplets to the ink absorptive layer 8 substantially without the fixation of the ink to the ink permeable layer, preferably the function of leading the ink droplets very rapidly to the ink absorptive layer 8. As a result, even immediately after image recording by an ink jet recording method, any ink does not stay on the recorded face of the recording medium 10, that is, on the surface of the ink permeable layer 9, and the image can be touched by a hand.

The ink absorptive layer 8 may have any composition without particular limitation so far as the ink can be fixed, preferably the ink can be fixed to a part very close to the backside surface 3 of the lenticular lens 1. Preferred materials for the ink absorptive layer 8 include water absorptive resins such as acrylic or methacrylic resins, vinyl chloride resins, vinyl acetate resins, nylons, styrene/acrylic resins, styrene/butadiene resins, polystyrene/acrylic resins, polystyrene/isoprene resins, methyl methacrylate/butyl methacrylate resins, melamine resins, polycarbonate resins, urea resins, epoxy resins, urethane resins, phenol resins, diallyl phthalate resins, and polyester resins, particularly preferably cationic water absorptive polymers, for example, polymers of neutralized salts and quaternized products of dialkylaminoalkyl (meth)acrylates such as dimethylaminoethyl (meth)acrylate and diethylaminoethyl (meth)acrylate, and dialkylaminoalkyl (meth)acrylamides such as dimethylaminomethyl (meth)acrylamide and dimethylaminopropyl (meth)acrylamide, and anionic water absorptive polymers, for example, polymers of (meth)acrylic acid, 2-acrylamide-2-methylpropanesulfonic acid, vinylsulfonic acid, styrenesulfonic acid, itaconic acid, maleic acid, fumaric acid, and arylsulfonic acid.

The ink absorptive layer 8 may comprise water absorptive or particle adsorptive inorganic particles. Examples of inorganic particles include silica, kaolinite, talc, precipitated calcium carbonate, heavy calcium carbonate, zeolite, alumina, barium sulfate, carbon black, zinc oxide, zinc sulfate, zinc carbonate, titanium dioxide, satin white, aluminum silicate, diatomaceous earth, calcium silicate, aluminum hydroxide, hydrated halloysite, magnesium carbonate, and magnesium hydroxide. These inorganic particles are preferably used in combination with a resin as a binder to form an ink absorption layer. Examples of such binders include polyester resins, polyurethane resins, polyester urethane resins, acrylic resins, melamine resins, polyvinyl alcohol resins, polyvinylpyrrolidones, and methylcelluloses. The inorganic particles may be mixed with the above water absorptive resin to form an ink absorptive layer 8.

The ink permeable layer 9 may be formed of any material so far as the material has the function of leading ink droplets to the ink absorptive layer 8. Preferably, the ink permeable layer 9 has a non-water-absorptive porous structure. This porous structure may be formed of particles. Examples of such particles include particles of silica, kaolinite, talc, calcium carbonate, zeolite, alumina, barium sulfate, carbon black, zinc oxide, titanium oxide, organic white pigment, benzoguanamine, crosslinked polystyrene, crosslinked acrylic polymers, and aluminum hydroxide. These particles may be fixed by a binder to form a porous structure. Examples of binders usable herein include polyester resins, polyacrylic resins, polyurethane resins, and various copolymers. Preferred binders include acrylic resins and acryl-styrene copolymers that have no significant water absorption.

In a preferred embodiment of the present invention, surfactants and the like may be added to the ink permeable layer 9 from the viewpoint of improving and regulating the ink permeation rate and the like.

In a preferred embodiment of the present invention, a recording medium having a white background can be provided by rendering any one or both of the ink permeable layer 9 and the ink absorptive layer 8 nontransparent.

Further, in one embodiment of the present invention, a layer may be provided between the ink absorptive layer 8 and the ink permeable layer 9. For example, a layer for enhancing the adhesion between both the layers may be provided.

The recording medium according to the first aspect of the present invention may be produced by dissolving or dispersing the component(s) for constituting the ink absorptive layer 8 and optionally the binder, for example, in water or an organic solvent to prepare a composition, coating the composition onto the backside surface 3 of the lenticular lens, drying the coating, coating a composition, prepared by dissolving or dispersing the component(s) for constituting the ink permeable layer 9 and the binder in a suitable solvent, for example, water or an organic solvent, onto the ink absorptive layer 8, and drying the coating.

Recording Medium According to Second Aspect of Invention

A recording medium 20 according to the second aspect of the present invention has a fundamental structure as shown in FIG. 3. In FIG. 3, an ink absorptive layer 21 is provided on a lenticular lens layer 1 on its backside surface 3. More preferably, an ink permeable layer 22 is provided on the ink absorptive layer 21, that is, the surface of the recording medium 20 remote from the lenticular lens layer 1. Further, an adhesive layer 23 which surrounds the peripheral part of the recording medium is provided on the ink permeable layer 22, and also a release sheet 24 is provided on the adhesive layer 23. As will be described later, in the recording medium 20 according to the second aspect of the present invention, ink jet recording is carried out, the release sheet 24 is then separated, and, in this state, the recording medium 20 can easily be fixed through the adhesive layer 23 onto a support such as a wall, a cardboard, or a postcard.

Figure 4:
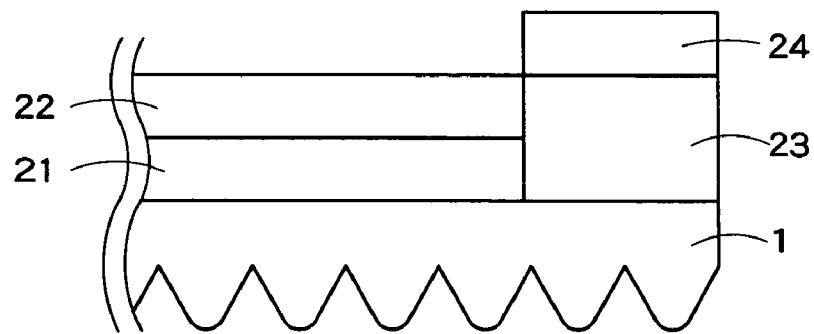
FIG. 4 is a diagram showing a recording medium in an embodiment wherein an adhesive layer 23 is provided directly on a lenticular lens 1.

In the present invention, the provision of the adhesive layer 23 on a part of the recording medium in its printing side suffices for the fixation of the recording medium onto a substrate. When reliable fixation is necessary, as shown in FIG. 3, the provision of the adhesive layer surrounding the peripheral part of the recording medium is preferred. Further, in FIG. 3, the adhesive layer 23 is provided on the ink permeable layer 22. Alternatively, as shown in FIG. 4, a construction may also be adopted in which the adhesive layer 23 is provided directly on the lenticular lens 1 in its adhesive layer forming region and the release sheet 24 is provided on the adhesive layer 23. In this embodiment, printing by an ink jet recording method is not substantially carried out in the part where the adhesive layer 23 has been provided. This part may be previously colored and subjected to printing of a pattern. In the recording medium according to the second aspect of the present invention, as shown in FIG. 5, a plurality of recording media are connected to each other by easy separation means 25. Examples of such easy separation means 25 include perforation and incisions to such a level that can easily cause breaking for separation of the plurality of recording media from each other.

The composition of the adhesive layer 23 is not particularly limited so far as the composition has tackiness high enough to fix the recording medium to a support. Further, the material for the release sheet 24 is also not limited so far as the sheet is adhered to the adhesive layer 23, has strength high enough to avoid the separation of the adhesive layer during carrying of the recording medium through an ink jet recording printer, and can easily be separated in the fixation of the recording medium to a support. For example, coated paper is preferred.

As with the recording medium according to the first aspect of the present invention, in the recording medium according to the second aspect of the present invention, recording is carried out by an ink jet recording method from the ink permeable layer 22 side which is opposite to the lenticular lens layer 1. Ink droplets ejected by the ink jet recording method are deposited onto the ink permeable layer 22, are permeated through the ink permeable layer 22, reach the ink absorptive layer 21, and are fixed within the ink absorptive layer 21, preferably the ink absorptive layer 21 in its part very close to the backside surface 3 of the lenticular lens 1 to form an image. The image is formed by an ink jet recording method so as to be perceived as a three-dimensional image or a motion picture through the lenticular lens. The ink permeable layer 22 has the function of leading ink droplets to the ink absorptive layer 21 substantially without the fixation of the ink to the ink permeable layer, preferably the function of leading the ink droplets very rapidly to the ink absorptive layer 21. As a result, even immediately after image recording by an ink jet recording method, any ink does not stay on the recorded face of the recording medium 20, that is, on the surface of the ink permeable layer 22, and the image can be touched by a finger.

The construction and composition in the ink absorptive layer 21 may be the same as those in the ink absorptive layer in the recording medium according to the first aspect of the present invention. The construction and composition in the ink permeable layer 22 may be the same as those in the ink permeable layer in the recording medium according to the first aspect of the present invention.

The recording medium according to the second aspect of the present invention may be produced by dissolving or dispersing the component(s) for constituting the ink absorptive layer 21 and optionally the binder in a suitable solvent, for example, in water or an organic solvent to prepare a composition, coating the composition onto the backside surface 3 of the lenticular lens, drying the coating, coating a composition, prepared by dissolving or dispersing the component(s) for constituting the ink permeable layer 22 and the binder in a suitable solvent, for example, water or an organic solvent, onto the ink absorptive layer 21, drying the coating, and further providing the adhesive layer 23 and the release sheet 24 on a part of the ink permeable layer 22.

Recording Medium According to Third Aspect of Invention

A recording medium 30 according to the third aspect of the present invention has a fundamental structure as shown in FIG. 6. In FIG. 6, an ink absorptive layer 31 is provided on a lenticular lens layer 1 on its backside surface 3. Preferably, an ink permeable layer 32 is further provided on the ink absorptive layer 31. In the recording medium according to the present invention temporarily applicable part 33 is further provided. FIG. 7 is an enlarged view of a temporarily applicable part 33 in the recording medium according to the present invention. In the embodiment shown in FIG. 7, the temporarily applicable part 33 is provided as a part of a transparent sheet 34 provided between the lenticular lens 1 and the ink receptive layer 31. The transparent sheet 34 is larger than the lenticular lens 1, and the transparent sheet 34 in its part protruded from the lenticular lens 1 is the part 33. Further, in a preferred embodiment of the present invention, the part 33 is connected to the transparent sheet 34 by the easy separation means 35, for example, perforation and incisions to such a level that can easily cause breaking.

The recording medium according to the third aspect of the present invention is in use applied to one side of a sheet having an adhesive layer on its one or both sides. The sheet having an adhesive layer on its one or both sides has a fundamental structure as shown in FIG. 8. In FIG. 8, preferably, a sheet 40 comprises a sheet 41 having the same size as the recording medium according to the present invention and a region 42 applicable to the temporarily applicable part in the recording medium according to the present invention. The recording medium 30 according to the present invention is applied to the sheet 40 as follows. The part 33 in the recording medium 30 according to the present invention is first temporarily applied onto the part 42 in the sheet 40, and positioning is then carried out. That is, positioning is carried out so that the recording medium 30 and the sheet 41 can be superimposed on top of the other accurately at a predetermined position. After the positioning, the recording medium 30 is applied to the sheet 41, and, if necessary, the part 33 in the recording medium and the part 42 in the sheet 40 are cut away, whereby the sheet 41 can be well applied to the recording medium. When the sheet 41 is a postcard or a mount having an adhesive layer on its one side, the recording medium 30 can be well applied to the postcard or the mount without misalignment. When the sheet 41 has an adhesive layer on its both sides, the recording medium 30 can be further well applied to another support, for example, a mount or a wall.

FIG. 9 is an enlarged view of the part 42 or its vicinity in the sheet 40 shown in FIG. 8 in a preferred embodiment of the present invention. The sheet 40 comprises a base material sheet 51, an adhesive layer 52, and a release sheet 53 for protecting the adhesive layer 52. The part 42 in the sheet 40 comprises an extended part 51a in the base material sheet 51, an adhesive layer 52a provided on the extended part 51a, and a release sheet 53a for protecting the adhesive layer 52a. In a preferred embodiment of the present invention, this part 42 is connected to the sheet 41 by easy separation means 54, for example, perforation or incision to such a depth that can easily cause breaking. In the application of the part 42 to the temporarily applicable part 33 in the recording medium 30, the release sheet 53a is separated from the sheet 40, and the part 42 is then temporarily applied to the temporarily applicable part 33 in the recording medium 30 for positioning, and the release sheet 53 is separated, followed by the application of the sheet 42 to the recording medium 30. Thereafter, if necessary, the part 42 is cut off from the means 54. In a preferred embodiment of the present invention, as shown in FIG. 9, in the sheet 40, a construction having an adhesive layer on both sides of the base material sheet may also be adopted in which an adhesive layer 55 and a release sheet 56 are provided on the other side the base material sheet 51 remote from the adhesive layer 52 and the release sheet 53. According to this embodiment, the recording medium 30 can be well applied to another support, for example, a mount or a wall.

In the recording medium in the third embodiment of the present invention, as shown in FIG. 10, a plurality of recording media may be connected to each other through easy separation means 61. For the recording medium in this embodiment, preferably, the sheet having an adhesive layer on its one or both sides is also in such a form that a plurality of sheets are connected to each other by easy separation means.

As with the recording medium according to the first aspect of the present invention, in the recording medium according to the third aspect of the present invention, recording is carried out by an ink jet recording method from the ink permeable layer 32 side which is opposite to the lenticular lens layer 1. Ink droplets ejected by the ink jet recording method are deposited onto the ink permeable layer 32, are permeated through the ink permeable layer 32, reach the ink absorptive layer 31, and are fixed within the ink absorptive layer 31, preferably the ink absorptive layer 31 in its part very close to the backside surface 3 of the lenticular lens 1 to form an image. The image is formed by an ink jet recording method so as to be perceived as a three-dimensional image or a motion picture through the lenticular lens. The ink permeable layer 32 has the function of leading ink droplets to the ink absorptive layer 31 substantially without the fixation of the ink to the ink permeable layer, preferably the function of leading the ink droplets very rapidly to the ink absorptive layer 31. As a result, even immediately after image recording by an ink jet recording method, any ink does not stay on the recorded face of the recording medium 30, that is, on the surface of the ink permeable layer 32, and the image can be touched by a finger.

The construction and composition in the ink absorptive layer 31 may be the same as those in the ink absorptive layer in the recording medium according to the first aspect of the present invention. The construction and composition in the ink permeable layer 32 may be the same as those in the ink permeable layer in the recording medium according to the first aspect of the present invention.

The recording medium according to the third aspect of the present invention may be produced by dissolving or dispersing the component(s) for constituting the ink absorptive layer 31 and optionally the binder in a suitable solvent, for example, water or an organic solvent to prepare a composition, coating the composition onto the backside surface 3 of the lenticular lens, drying the coating, coating a composition, prepared by dissolving or dispersing the component(s) for constituting the ink permeable layer 32 and the binder in a suitable solvent, for example, water or an organic solvent, onto the ink absorptive layer 31, and drying the coating.

What is claimed is:

1. In combination, a recording medium and a sheet with two sides having an adhesive layer on one or both of the sides, the recording medium comprising: a lenticular lens layer having a convex part surface, on which a plurality of semicylindrical or arcuate and elongated convex parts are arranged in parallel, and a backside surface; and an ink absorptive layer provided on the backside surface of the lenticular lens layer, printing being performed from the ink absorptive layer side by an ink jet recording method to record an image, and further comprising a temporarily applicable part that, in use, which is applied to one side of a sheet having an adhesive layer on its one or both sides and is temporarily applicable to the sheet, the sheet comprising a region applicable to the recording medium on its temporarily applicable part, the region being connected to the sheet by easy separation means.

2. The combination according to claim 1, wherein the temporarily applicable part is a sheet member connected to one side of the recording medium by the easy separation means.

3. The combination according to claim 1, wherein the sheet, having an adhesive layer on its one or both sides, in its part excluding the region applicable to the recording medium on its temporarily applicable part has a size equal to the size of the recording medium.

4. The combination according to claim 3, wherein the sheet having an adhesive layer on its one side is a postcard.

5. A recorded matter formed from the combination of claim 1 and comprising an image observable as a three-dimensional image or a motion picture provided on the recording medium.

6. In combination, a recording medium and a sheet, the recording medium including (a) a main portion comprising (i) a lenticular lens layer having a first surface comprising means for rendering images printed on the recording medium observable three-dimensionally or as if the images are in motion, and a backside surface; and (ii) an ink absorptive layer disposed on the backside surface of the lenticular lens layer; and (b) a protruding portion that protrudes from the main portion; the sheet comprising (a) a separable portion, (b) a main portion and (c) adhesion means on at least a first side of the sheet for adhering the separable portion of the sheet to the protruding portion of the recording medium until the main portion of the recording medium and the main portion of the sheet can be superimposed on top of one another at a desired position and for adhering the main portion of the sheet to the main portion of the recording medium with the respective main portions superimposed in the desired position; each of the protruding portion of the recording medium and the separable portion of the sheet comprising separation means for facilitating separation of the protruding portion and the separable portion from the main portion of the recording medium and the main portion of the sheet respectively with the respective main portions superimposed and adhered to each other in the desired position.

7. The combination according to claim 6, wherein the main portion of the recording medium and the main portion of the sheet are of the same size.

8. The combination according to claim 6, wherein the sheet comprises second adhesion means on a second side of the sheet for adhering the main portion of the sheet to a support surface.

9. The combination according to claim 6, wherein the separation means for each of the protruding portion of the recording medium and the separable portion of the sheet comprises perforations or incisions.

10. The combination according to claim 6, wherein the recording medium comprises an image that is observable as a three-dimensional image or a motion picture.

11. A method comprising (a) providing the combination of claim 10; and (b) adhering the protruding portion of the recording medium on the separable portion of the sheet and then aligning the main portion of the recording medium with the main portion of the sheet so that the respective main portions are superposed in a desired position; (c) adhering the main portion of the sheet to the main portion of the recording medium with the respective main portions superposed in the desired position; and (d) separating the protruding portion and the separable portion from the respective main portions to form a recorded matter.

12. The method according to claim 11, further comprising utilizing the recorded matter as a postcard.

13. A method comprising (a) providing the combination of claim 8; and (b) adhering the protruding portion of the recording medium on the separable portion of the sheet and then aligning the main portion of the recording medium with the main portion of the sheet so that the respective main portions are superposed in a desired position; (c) adhering the main portion of the sheet to the main portion of the recording medium with the respective main portions superposed in the desired position; and (d) separating the protruding portion and the separable portion from the respective main portions to form a recorded matter.

14. The method according to claim 13, further comprising mounting the recorded matter on a support surface.

* * * * *